(12) United States Patent
Suginouchi et al.

(10) Patent No.: US 6,925,891 B2
(45) Date of Patent: Aug. 9, 2005

(54) ULTRASONIC FLOWMETER AND METHOD OF MEASURING FLOW VOLUME

(75) Inventors: Takehiko Suginouchi, Nara (JP); Masahiko Hashimoto, Shijonawate (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/423,630

(22) Filed: Apr. 25, 2003

(65) Prior Publication Data

US 2003/0200817 A1 Oct. 30, 2003

(30) Foreign Application Priority Data

Apr. 30, 2002 (JP) ........................................ 2002-128063

(51) Int. Cl.[7] .................................................. G01F 1/66
(52) U.S. Cl. .................................. 73/861.27; 73/861.28
(58) Field of Search .......................... 73/861.29, 861.28, 73/861.27, 861.31

(56) References Cited

FOREIGN PATENT DOCUMENTS

| EP | 0 426 309 A2 | 5/1991 |
|---|---|---|
| JP | 61-28016 | 2/1986 |
| JP | 3-42524 | 4/1991 |
| JP | 08-201411 A | 8/1996 |
| JP | 9-33308 | 8/1997 |
| JP | 11-108714 A | 4/1999 |
| JP | 11-118551 | 4/1999 |
| JP | 2001-249038 A | 9/2001 |
| WO | WO 97/14936 A1 | 4/1997 |

OTHER PUBLICATIONS

"Method of Flow Measurement by Ultrasonic Flowmeters," Japan Electric Measuring Instruments Standards (JEMIS), vol. 032, pp. 1–52 (1987).

*Primary Examiner*—Harshad Patel
(74) *Attorney, Agent, or Firm*—Akin Gump Strauss Hauer & Feld, LLP

(57) ABSTRACT

An ultrasonic flowmeter arranged to perform measurement with high accuracy has first and second ultrasonic transducers 1, 2 which transmit and receive ultrasonic waves, and which are placed so as to form a path for propagation of the ultrasonic waves in a flow passage 14 for a fluid, a transmitting section 3 which drives one of said first and second ultrasonic transducers 1, 2, a first matching section 5 which is connected to the transmitting section, and which adjusts the output impedance of the transmitting section, and a receiving section 6 which has an input impedance approximately equal to or lower than the adjusted output impedance, and which receives the ultrasonic wave reaching the other of the first and second ultrasonic transducers. The flow volume of the fluid is measured by detecting a bidirectional-propagation time difference between the ultrasonic waves propagating in the propagation path.

22 Claims, 13 Drawing Sheets

ULTRASONIC FLOWMETER AND METHOD OF MEASURING FLOW VOLUME

BACKGROUND OF THE INVENTION

1. Field of the Invention

The present invention relates to an ultrasonic flowmeter for measuring the flow volume of a fluid by using an ultrasonic wave and a method of measuring the flow volume of a fluid. The present invention also relates to a gas meter.

2. Description of the Related Art

Ultrasonic flowmeters have advantages such as simplicity in structure, a smaller number of mechanical moving portions, a wide flow volume measurable range, no pressure loss due to use of the flowmeter, etc. The measuring accuracy of ultrasonic flowmeters can also be improved utilizing the recent advanced electronics. Thus, ultrasonic flowmeters are studied in various fields such as gas meter application, where the flow volume of a gas or a liquid must be measured.

The structure of a conventional ultrasonic flowmeter and the principle of measurement using the ultrasonic flowmeter will be described. FIG. 12 is a block diagram of an example of a conventional ultrasonic flowmeter. The conventional ultrasonic flowmeter is, for example, one disclosed in Japan Electric Measuring Instruments Manufacturer's Association Standard, JEMIS 5032 "Method of Measuring Flow volume by Ultrasonic Wave", Japan Electric Measuring Instruments Manufacturer's Association (Public Corporation), 1987.

As shown in FIG. 12, ultrasonic transducers 1 and 2 are placed on opposite sides of a flow passage 14 through which a fluid flows. The ultrasonic transducers 1 and 2 respectively functions as a transmitter and a receiver. That is, if the ultrasonic transducer 1 is used as a transmitter, ultrasonic transducer 2 is used as a receiver. If the ultrasonic transducer 2 is used as a transmitter, ultrasonic transducer 1 is used as a receiver. As shown in FIG. 12, the ultrasonic propagation path formed between the ultrasonic transducers 1 and 2 is inclined by an angle θ from the direction of flow of the fluid.

In the case of propagation of an ultrasonic wave from the ultrasonic transducer 1 to the ultrasonic transducer 2, the ultrasonic wave travels in a forward direction relative to the flow of the fluid and the velocity of the ultrasonic wave is therefore increased. In the case of propagation of an ultrasonic wave from the ultrasonic transducer 2 to the ultrasonic transducer 1, the ultrasonic wave travels in a reverse direction with respect to the flow of the fluid and the velocity of the ultrasonic wave is therefore reduced. Therefore, the velocity of the fluid can be obtained from the difference between the time period during which the ultrasonic wave travels from the ultrasonic transducer 1 to the ultrasonic transducer 2 and the time period during which the ultrasonic wave travels from the ultrasonic transducer 2 to the ultrasonic transducer 1. Also, the flow volume can be obtained from the product of the sectional area of the fluid passage 14 and the flow velocity.

An example of a measurement method based on a sing-around method will be described as a method of obtaining the flow volume of a fluid on the basis of the above-described principle will be described.

As shown in FIG. 12, the ultrasonic flowmeter has a transmitting section 3 and a receiving section 6. The ultrasonic transducer 1 is selectively connected to one of the transmitting section 3 and the receiving section 6 by the switching section 10. At this time, the ultrasonic transducer 2 is connected to the other of the transmitting section 3 and the receiving section 6 to which the ultrasonic transducer 1 is not connected.

When the transmitting section 3 and the ultrasonic transducer 1 are connected, the transmitting section 3 drives the ultrasonic transducer 1 and the ultrasonic wave generated by the ultrasonic transducer 1 reaches the ultrasonic transducer 2 by traveling across the flow of the fluid. The ultrasonic wave received by the ultrasonic transducer 2 is converted into an electric signal. This received signal is amplified by a receiving section 6. A zero-cross detection section 7 detects a zero-cross point immediately after a time at which a predetermined level is reached by the received signal, and generates a zero-cross detection signal. The zero-cross point is a point at which the amplitude of the received signal changes from plus to minus or from minus to plus. This zero-cross point is assumed to be the time at which the ultrasonic wave reaches the ultrasonic transducer 2. On the basis of the zero-cross detection signal, a trigger signal is generated with a delay of a predetermined time period to be input the trigger signal to the transmitting section 3. The time period from the generation of the zero-cross detection signal to the generation of the trigger signal will be referred to as a delay time.

The transmitting section 3 drives the ultrasonic transducer 1 on the basis of the trigger signal to generate the next ultrasonic wave. This cycle in which a loop of transmission-reception-amplification and delay-transmission is repeated will be referred to as sing-around, and the number of times the loop is repeated will be referred to as the number of sing-arounds.

A time measurement section 9 measures the time taken to perform the loop a predetermined number of times, and sends the result of measurement to a flow volume computation section 11. The switching section 10 is then switched to use the ultrasonic transducer 2 as a transmitter and the ultrasonic transducer 1 as a receiver. Measurement is thereafter performed in the same manner as that described above.

A value obtained as the product of the delay time and the number of sing-arounds is subtracted from the time period measured by the above-described method, and the result of this subtraction is divided by the number of sing-arounds to obtain an ultrasonic wave propagation time. Let the propagation time when the ultrasonic transducer 1 is in the transmitting position be t1, and let the propagation time when the ultrasonic transducer 2 is in the transmitting position be t2.

Also, let the distance between the ultrasonic transducer 1 and the ultrasonic transducer 2 L, and let the flow velocity of the fluid and the sound velocity of the ultrasonic wave be V and C, respectively, as shown in FIG. 12.

Then t1 and t2 are expressed by the following equations:

[Equation 1]

$$t1 = \frac{L}{C + V\cos\theta} \qquad (1)$$

$$t2 = \frac{L}{C - V\cos\theta}$$

From these equations, the flow velocity V is expressed by the following equation:

[Equation 2]

$$V = \frac{L}{2\cos\theta}\left(\frac{1}{t1} - \frac{1}{t2}\right) \quad (2)$$

After the calculation of the flow rate V, the flow volume Q is obtained from the product of the sectional area of the flow passage 14 and the flow velocity V.

In the above-described ultrasonic flowmeter, zero-cross detection is used to measure the times t1 and t2 that ultrasonic waves propagate between the ultrasonic transducer 1 and the ultrasonic transducer 2. Therefore there must be coincidence between the waveform obtained when the ultrasonic wave transmitted from the ultrasonic transducer 1 is received by the ultrasonic transducer 2, and the waveform obtained when the ultrasonic wave transmitted from the ultrasonic transducer 2 is received by the ultrasonic transducer 1.

In actuality, however, the waveforms do not coincide perfectly with each other because of the characteristic difference between the ultrasonic transducer 1 and the ultrasonic transducer 2. FIG. 13 shows a waveform 18 obtained when the ultrasonic wave transmitted from the ultrasonic transducer 1 is received by the ultrasonic transducer 2 and a waveform 19 obtained when the ultrasonic wave transmitted from the ultrasonic transducer 2 is received by the ultrasonic transducer 1 in a case where the flow velocity of the fluid is zero and the ultrasonic transducer 1 and the ultrasonic transducer 2 differ in characteristics from each other. The zero-cross point in the waveform 18 immediately after a level a has been exceeded by the received signal is indicated as a point 18a, and the corresponding zero-cross point in the waveform 19 is indicated as a point 19a. These points do not coincide with each other. That is, an erroneous flow volume is indicated even when the gas or liquid to be measured is not flowing.

The ultrasonic transducer 1 is constituted by a piezoelectric element usually having a temperature dependent characteristic. FIG. 14 shows a temperature dependence of the difference Δt between the above-mentioned propagation times t1 and t2 when the flow velocity of the fluid is zero. In some cases, At changes generally in proportion to the temperature, as indicated by a curve 20a in FIG. 14, or increases or decreases abruptly with the increase in temperature, as indicated by a curve 20b or 20c. This is because the ultrasonic transducer 1 and the ultrasonic transducer 2 have different temperature dependent characteristics and hence the characteristic varies depending on the combination of the ultrasonic transducers.

Therefore, in the case of measurement with a gas meter incorporating the conventional ultrasonic flowmeter, an error due to the characteristic difference between the two ultrasonic transducers can cause a false indication that the gas is used in the case where a gas is not actually used. Also, the temperature dependence of the characteristic difference causes difference in the amounts of gas use measurement for a single gas appliance between different times, for example, a morning time when the atmospheric temperature is lowest in one day, and a time of the daytime when the atmospheric temperature rises.

Also, if the gas meter has a gas leak detection function, there can be not only an error in measurement but also a lowered reliability of the gas leak detection function.

SUMMARY OF THE INVENTION

In view of the above-described problem of the conventional art, an object of the present invention is to provide an ultrasonic flowmeter capable of measurement with high accuracy.

To achieve the above-described object, according to one aspect of the present invention, there is provided an ultrasonic flowmeter having first and second ultrasonic transducers which transmit and receive ultrasonic waves, and which are placed so as to form a path for propagation of the ultrasonic waves in a flow passage for a fluid, a transmitting section which drives one of the first and second ultrasonic transducers, a first matching section which is connected to the transmitting section, and which adjusts the output impedance of the transmitting section, and a receiving section which has an input impedance approximately equal to or lower than the adjusted output impedance, and which receives the ultrasonic wave reaching the other of the first and second ultrasonic transducers, wherein the flow volume of the fluid is measured by detecting a bidirectional-propagation time difference between the ultrasonic waves propagating in the propagation path.

In the above-described ultrasonic flowmeter, the adjusted output impedance may be larger than ½ of the impedance value that one of the first and second ultrasonic transducers has at its resonance frequency.

In the above-described ultrasonic flowmeter, the adjusted output impedance may be substantially equal to the impedance value of one of the first and second ultrasonic transducers.

In the above-described ultrasonic flowmeter, the input impedance may be 40 Ω or lower and, more preferably, 20 Ω or lower.

The above-described ultrasonic flowmeter may further have a reflected wave detection section for detecting a reflected wave caused by an impedance mismatch between the first or second ultrasonic transducer and the transmitting section.

The above-described ultrasonic flowmeter may further have a directional coupler for selectively guiding the reflected wave to the reflected wave detection section.

The above-described ultrasonic flowmeter may further have a control section for controlling the first matching section on the basis of the reflected wave detected by the reflected wave detection section.

The above-described ultrasonic flowmeter may further have a first switching section for selectively connecting the first matching section and one of the first and second ultrasonic transducers, and a second switching section for selectively connecting the receiving section and one of the first and second ultrasonic transducers.

In the above-described ultrasonic flowmeter, the first matching section may be adjusted so that the output impedance is substantially matched to the impedance at the resonance frequency of the ultrasonic transducer selected by the switching section.

The above-described ultrasonic flowmeter may further have a second matching section for adjusting the output impedance of the transmitting section, a first switching section for selectively connecting the transmitting section and one of the first matching section and the second matching section, and a second switching section for selectively connecting the receiving section and one of the first and second ultrasonic transducers, the first and second matching sections being respectively connected to the first and second ultrasonic transducers.

In the above-described ultrasonic flowmeter, each of the first and second matching sections may be adjusted so that the output impedance is substantially matched to the impedance of the corresponding one of the first and second ultrasonic transducers at the resonance frequency.

In the above-described ultrasonic flowmeter, each of the first and second ultrasonic transducers may vibrate in a thickness vibration mode.

The above-described ultrasonic flowmeter may further have a detection section for detecting a received signal amplified by the receiving section, and the time of arrival of the received signal may be determined according to a zero-cross point in the detection section.

The above-described ultrasonic flowmeter may further have a detection section for detecting a received signal amplified by the receiving section, a plurality of zero-cross points may be set with respect to the received signal in the detection section, and correction of the flow volume may be made by using the plurality of zero-cross points.

According to another aspect of the present invention, there is provided a gas meter having the above-described ultrasonic flowmeter, the ultrasonic flowmeter being provided on a flow passage in which a gas flows, a shutoff valve which shuts off the gas flowing in the flow passage, and a control unit which controls the ultrasonic flowmeter and the shutoff valve.

According to still another aspect of the present invention, there is provided a method of measuring the flow volume of a fluid, the method including the steps of: providing a pair of ultrasonic transducers as a transmitter and a receiver, so as to form a path for propagation of ultrasonic waves in a flow passage for a fluid; propagating ultrasonic waves in two directions along the propagation path by using a transmitting section for driving one of the pair of ultrasonic transducers and a receiving section which has an input impedance approximately equal to or lower than the output impedance of the transmitting section, and which receives the ultrasonic wave reaching the other of the pair of ultrasonic transducers; and measuring the flow volume of the fluid by detecting a bidirectional-propagation time difference between the ultrasonic waves propagating along the propagation path.

In the above-described method, the output impedance of the transmitting section may be adjusted to a value at least ½ of the impedance at a resonance frequency of the ultrasonic transducer used as a transmitter, and the input impedance of the receiving section for receiving the ultrasonic wave may be set to a value equal to or smaller than the output impedance of the transmitting section.

In the above-described method, the output impedance of the transmitting section may be adjusted to a value substantially equal to the impedance at a resonance frequency of the ultrasonic transducer used as a transmitter.

In the above-described method, the input impedance of the receiving section may be set to 40Ω or lower and, more preferably, to 20Ω or lower.

In the above-described method, a reflected wave caused by an impedance mismatch between the pair of ultrasonic transducers and the transmitting section may be detected and the output impedance of the transmitting section may be adjusted so that the reflected wave becomes smaller.

DETAILED DESCRIPTION OF THE PREFERRED EMBODIMENTS

The principle of the operation of an ultrasonic flowmeter in accordance with the present invention will first be described.

Figure 1A:
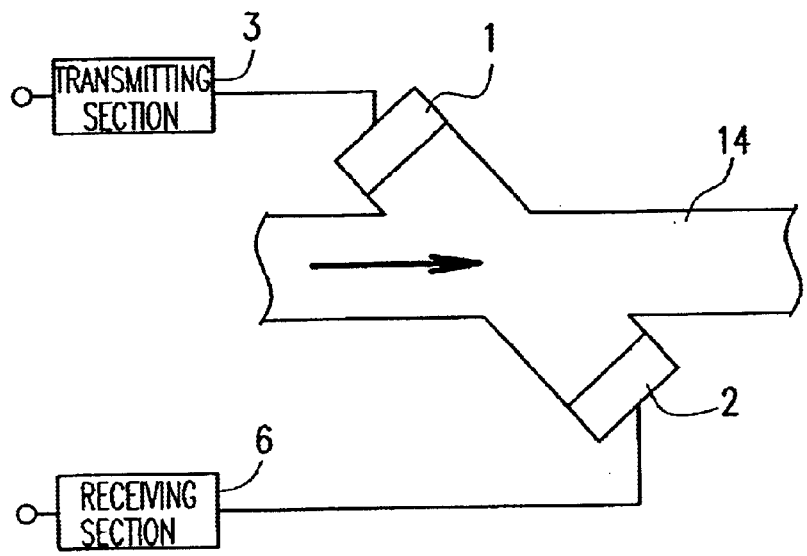
FIG. 1A is a block diagram for explaining the principle of an ultrasonic flowmeter of the present invention.
Figure 1B:
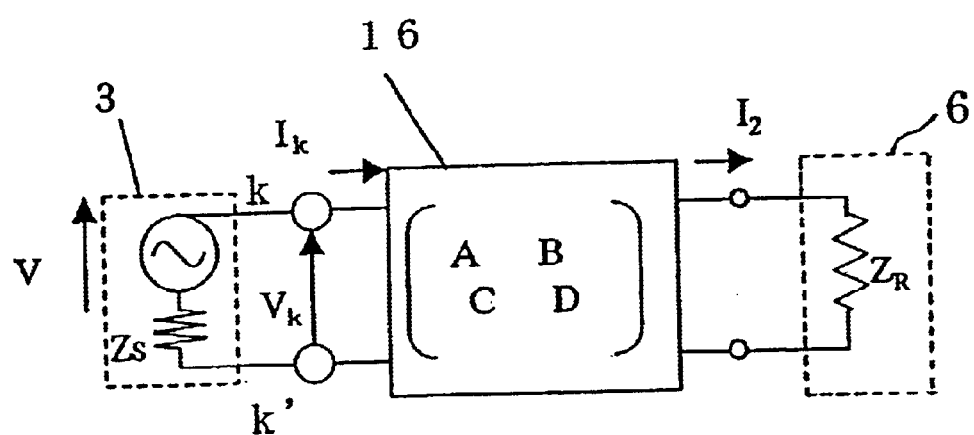
FIG. 1B is a diagram showing a four-terminal circuit network representing a portion of the ultrasonic flowmeter shown in FIG. 1A.

Referring to FIG. 1A, a first ultrasonic transducer 1 and a second ultrasonic transducer 2 are placed on a flow passage 14 for a fluid to measure the flow volume of the fluid. A case will be considered where a transmitting section 3 and a receiving section 6 are connected to the first ultrasonic transducer 1 and the second ultrasonic transducer 2, respectively, as shown in FIG. 1A, and where an ultrasonic wave transmitted from the first ultrasonic transducer 1 is received by the second ultrasonic transducer 2. In FIG. 1B, the portion of the ultrasonic flowmeter shown in FIG. 1A is expressed as a four-terminal circuit network using an F parameter. Referring to FIG. 1B, let the system formed of the first ultrasonic transducer 1, the second ultrasonic transducer 2 and the flow passage 14 be a transmission line 16, the output impedance of the transmitting section 3 be $Z_S$, and the input impedance of the receiving section 6 be $Z_R$. The non-load voltage between terminals k and k' of the transmitting section 3 is represented by V. Under the condition where the transmission line 16 is connected between the terminals k and k', let the voltage between the terminals k and k' be $V_k$, the current flowing through the terminal be $I_k$, and the current flowing through the input impedance $Z_R$ be $I_2$.

The impedance $Z_k$ as seen from the terminals k and k' of the system formed of the transmission line 16 and the receiving section 6 connected to the transmission line 16 is expressed by the following equation (3) using the F parameter:

[Equation 3]

$$Z_k = \frac{AZ_R + B}{CZ_R + D} \quad (3)$$

Figure 2A:
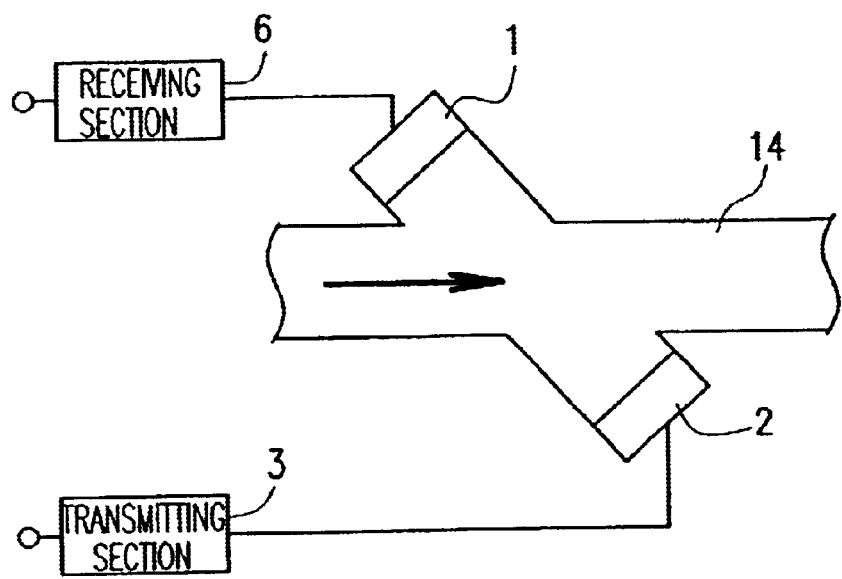
FIG. 2A is a block diagram for explaining the principle of the ultrasonic flowmeter of the present invention.
Figure 2B:
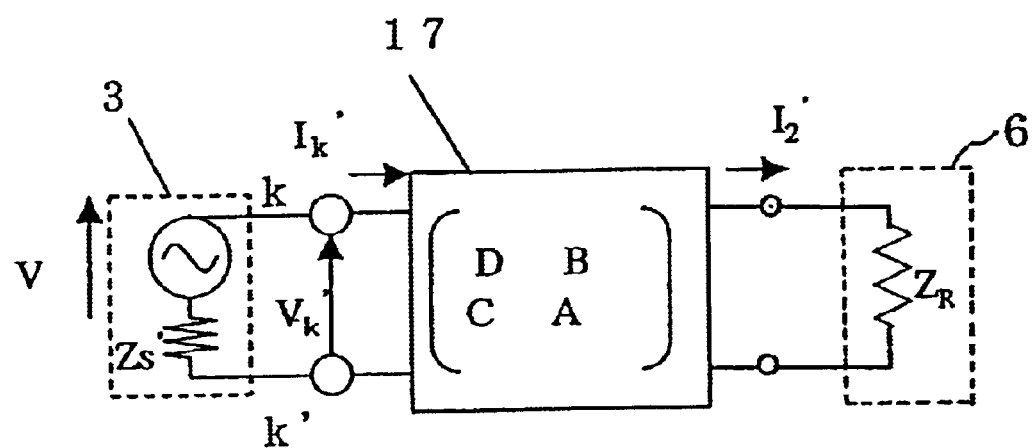
FIG. 2B is a diagram showing a four-terminal circuit network representing a portion of the ultrasonic flowmeter shown in FIG. 2A.

A case will next be considered where the receiving section 6 and the transmitting section 3 are connected to the first ultrasonic transducer 1 and the second ultrasonic transducer 2, respectively, as shown in FIG. 2A. Let the system formed of the first ultrasonic transducer 1, the second ultrasonic transducer 2 and the flow passage 14 be a transmission line 17, the output impedance of the transmitting section 3 be $Z_S'$, and the input impedance of the receiving section 6 be the same ($Z_R$). The non-load voltage between terminals k and k' of the transmitting section 3 is V. Under the condition where the transmission line 17 is connected between the terminals k and k', let the voltage between the terminals k and k' be $V_k'$, the current flowing through the terminal be $I_k'$, and the current flowing through the input impedance $Z_R$ be $I_2'$.

The impedance $Z_k'$ as seen from the terminals k and k' of the system formed of the transmission line 17 and the receiving section 6 connected to the transmission line 17 is expressed by the following equation (4):

[Equation 4]

$$Z_k' = \frac{DZ_R + B}{CZ_R + A} \quad (4)$$

On the other hand, the voltages $V_k$ and $V_k'$ between the terminals k and k' of the transmitting section 3 are shown by the following equations (5) and (6) using V, $Z_S$ and $Z_S'$:

[Equation 5]

$$V_k = \frac{Z_k}{Z_s + Z_k} V \quad (5)$$

[Equation 6]

$$V_k' = \frac{Z_k'}{Z_s' + Z_k'} \quad (6)$$

The equations (3) and (4) are respectively substituted in the equations (5) and (6) to express $V_k$ and $V_k'$ by the following equations (7) and (8):

[Equation 7]

$$V_k = \frac{AZ_R + B}{(CZ_R + D)Z_s + AZ_R + B} \quad (7)$$

[Equation 8]

$$V_k' = \frac{DZ_R + B}{(CZ_R + A)Z_s' + DZ_R + B} \quad (8)$$

The voltages in the receiving section 6 are expressed by $Z_R I_2$ and $Z_R I_2'$. Therefore the voltages $V_k$ and $V_k'$ between the terminals k and k' can be shown by the following equations using the F parameters of the transmission lines 16 and 17 and the currents $I_2$ and $I_2'$:

$$V_k = AZ_R I_2 + BI_2 \quad (9)$$

$$V_k' = DZ_R I_2' + BI_2' \quad (10)$$

An equation (11) shown below is obtained from the equation (7) and the equation (9). Similarly, an equation (12) shown below is obtained from the equation (8) and the equation (10).

[Equation 11]

$$\frac{AZ_R + B}{(CZ_R + D)Z_s + AZ_R + B} V = AZ_R I_2 + BI_2 \quad (11)$$

[Equation 12]

$$\frac{DZ_R + B}{(CZ_R + A)Z_s' + DZ_R + B} V = DZ_R I_2' + BI_2' \quad (12)$$

When the receiving impedance $Z_R$ satisfies $Z_R=0$ in the equation (11) and the equation (12), the equation (11) and the equation (12) are expressed by the following equations (13) and (14):

[Equation 13]

$$\frac{B}{DZ_s + B} V = BI_2 \quad (13)$$

[Equation 14]

$$\frac{B}{AZ_s' + B} V = BI_2' \quad (14)$$

If $Z_S=B/D$ and $Z_S'=B/A$ in the equation (13) and the equation (14), then $I_2=I_2'$. That is, it is shown that even when the transmitting and receiving points are changed between the first ultrasonic transducer 1 and the second ultrasonic transducer 2, the same wave is received by the receiving section 3.

When the input impedance $Z_R$ is zero ($Z_R=0$), $Z_k=B/D$ and $Z_k'=B/A$ from the equation (3) and the equation (4). At this time $Z_S=Z_k$ and $Z_S'=Z_k'$ from the above-mentioned supposition. Thus, it is shown that the output impedance $Z_S$ or $Z_S'$ of the transmitting section 3 is equal to the impedance $Z_k$ or $Z_k'$ of the system formed of the transmission line 16 or 17 and the receiving section 6 connected to the system. That is, the output impedance of the transmitting section 3 is equal to each of the impedances of the first ultrasonic transducer 1 and the second ultrasonic transducer 2.

As is apparent from the above, in measurement of the flow volume of the fluid moving in the flow passage 14 by using the first ultrasonic transducer 1 and the second ultrasonic transducer 2, the waveform obtained when the ultrasonic wave transmitted from the ultrasonic transducer 1 is received by the ultrasonic transducer 2 and the waveform obtained when the ultrasonic wave transmitted from the ultrasonic transducer 2 is received by the ultrasonic transducer 1 coincide with each other if the input impedance of the receiving section 6 is set to zero and if the output impedance of the transmitting section 3 is matched to each of the impedances of the first ultrasonic transducer 1 and the second ultrasonic transducer 2.

Figure 3:
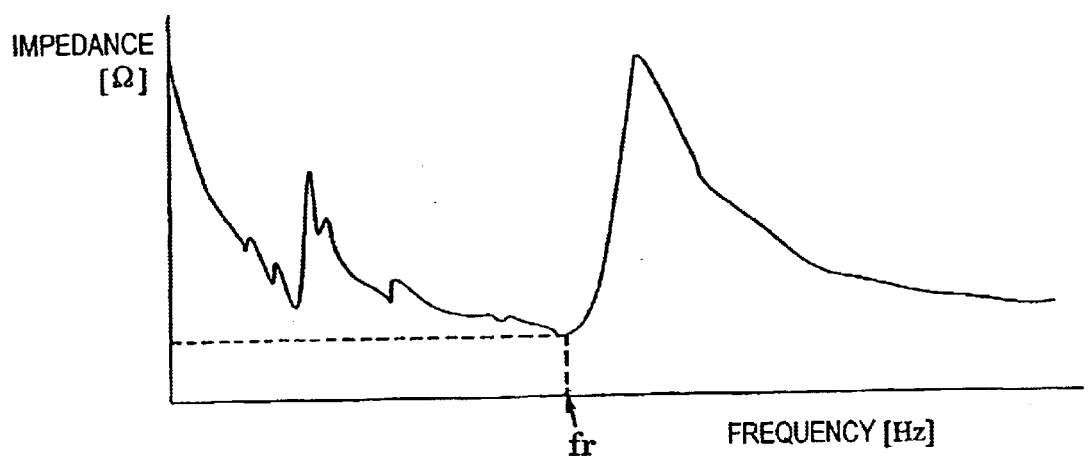
FIG. 3 is an impedance curve diagram showing electrical characteristics of the ultrasonic flowmeter of the present invention.

The ultrasonic transducer ordinarily has impedance-frequency characteristics such as shown in FIG. 3 and its impedance changes with respect to the frequency. At a resonance frequency $f_r$, the impedance value is minimized. In actuality, therefore, it is extremely difficult to match the output impedance of the transmitting section 3 to each of the impedances of the first ultrasonic transducer 1 and the second ultrasonic transducer 2 in all bands. However, when the ultrasonic transducer is used as a transmitter, it is driven at the resonance frequency. Accordingly, the condition that the output impedance of the transmitting section 3 be matched to each of the impedances of the first ultrasonic transducer 1 and the second ultrasonic transducer 2 is satisfied by matching the output impedance of the transmitting section 3 to each of the impedances of the first ultrasonic transducer 1 and the second ultrasonic transducer 2 at the resonance frequency.

The above-described conditions are ideal ones derived from the equations. The effect of the present invention is maximized when the conditions are satisfied. However, the case where the effect of the present invention can be achieved is not limited to the case where the conditions are completely satisfied. Setting the input impedance of the receiving section 6 to a sufficiently small value and setting the output impedance of the transmitting section 3 to a value close to each of the impedances of the first ultrasonic transducer 1 and the second ultrasonic transducer 2 at the resonance frequency. In actual circuits, it is not possible that the input impedance is just zero.

According to a detailed study made by the inventor of the present invention, the frequencies received by the first ultrasonic transducer 1 and the second ultrasonic transducer 2 are made substantially equal to each other without being influenced by a characteristic difference between the first ultrasonic transducer 1 and the second ultrasonic transducer 2 if the output impedance of the transmitting section 3 is at least lager than ½ of the impedance of the first ultrasonic transducer 1 or the second ultrasonic transducer 2 at the resonance frequency, and if the input impedance of the receiving section 6 is equal to or lower than about 100Ω. The input impedance of the receiving section 6 is, preferably, 40Ω or lower and, more preferably, 20Ω or lower. It is further preferred that the output impedance of the transmitting section 3 be about ±20% of the impedance of the first ultrasonic transducer 1 or the second ultrasonic transducer 2 at the resonance frequency and the input impedance of the receiving section 6 be equal to or lower than 10Ω.

These input impedance and output impedance are defined as the output impedance on the transmitting section side and the input impedance on the receiving section side seen from the first ultrasonic transducer 1 and the second ultrasonic transducer 2. That is, the wiring resistance and the resistance of a switch existing between the first and second ultrasonic transducers 1 and 2 and the transmitting and receiving sections 3 and 6 are also included in the input impedance and the output impedance.

In ordinary cases of driving a transmitting element by a transmitting section, it is preferred that the output impedance of the transmitting section be lower, because a higher voltage can be applied to the transmitting element when the output impedance is lower. On the other hand, with respect to amplification by an amplification section of a signal received by a receiving element, it is preferred that the input impedance of the receiving section be increased to enable the signal received by the receiving element to be detected and amplified with stability irrespective of the magnitude of the received signal. For this reason, the input impedance of the receiving section in the conventional ultrasonic flowmeter is set higher than the output impedance of the transmitting section. More specifically, the input impedance of the receiving section is set to several ten kilohms to several hundred kilohms, and the output impedance of the transmitting section is set to several ten ohms to several hundred ohms.

In contrast, under the above-described conditions, the input impedance of the receiving section is set to a value equal to or lower than 1/1000 of that in the conventional ultrasonic flowmeter. In a case where an ultrasonic transducer having typical characteristics (a resonance frequency and an impedance at the resonance frequency) for measurement in an ultrasonic flowmeter is used as each of the first ultrasonic transducer 1 and the second ultrasonic transducer 2, the input impedance of the receiving section is approximately equal to or lower than the output impedance of the transmitting section. If the input impedance of the receiving section is approximately equal to the output impedance of the transmitting section, the input impedance of the receiving section is reduced to about 1/1000 of that in the conventional setting. Thus, the input impedance of the receiving section is reduced to a value sufficiently smaller than that in the conventional ultrasonic flowmeter, thereby reducing the difference between received waves due to a characteristic difference between the first ultrasonic transducer 1 and the second ultrasonic transducer 2. If the input impedance of the receiving section is lower than the output impedance of the transmitting section and is closer to zero, the difference between received waves due to a characteristic difference between the first ultrasonic transducer 1 and the second ultrasonic transducer 2 is smaller.

Preferred embodiments of the ultrasonic flowmeter in accordance with the present invention will now be described.

(First Embodiment)

Figure 4:
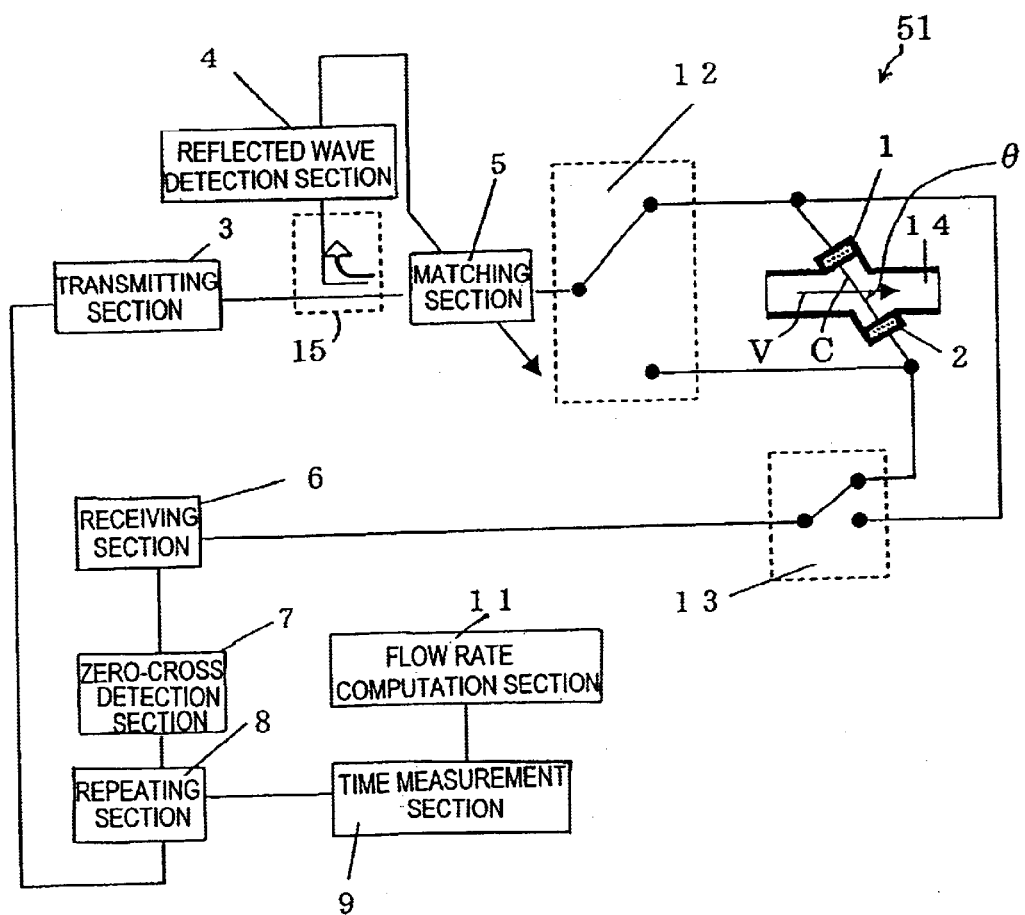
FIG. 4 is a block diagram showing an ultrasonic flowmeter which represents a first embodiment of the present invention.

FIG. 4 is a block diagram showing an ultrasonic flowmeter which represents a first embodiment of the present invention. An ultrasonic flowmeter 51 has a first ultrasonic transducer 1 and a second ultrasonic transducer 2 placed so as to form an ultrasonic wave propagation path in a flow passage 14 for a fluid. The ultrasonic flowmeter 51 also has a transmitting section 3, a matching section 5, and a receiving section 6.

Each of the first ultrasonic transducer 1 and the second ultrasonic transducer 2 functions as a transmitter and a receiver. An ultrasonic wave transmitted from the first ultrasonic transducer 1 is received by the second ultrasonic transducer 2, and an ultrasonic wave transmitted from the second ultrasonic transducer 2 is received by the first ultrasonic transducer 1. The bidirectional propagation path through which ultrasonic waves are transmitted and received in this manner has an angle θ from the direction in which the fluid flows in the flow passage 14. The angle θ is selected from the range of 10 to 40 degrees.

As each of the first ultrasonic transducer 1 and the second ultrasonic transducer 2, any of various ultrasonic transducers conventionally used may be used by being driven at a frequency of about 20 kHz or higher in a vibration mode such as a thickness vibration mode, a sideslip vibration mode or a longitudinal vibration mode. As this drive frequency, an optimum frequency is selected according to the state and kind of the fluid to be measured, a predicted flow velocity, etc. In this embodiment, an ultrasonic transducer vibrating in the thickness vibration mode and having a resonance frequency of 500 kHz for example is used. The resistance value at the resonance frequency is 150 to 200Ω.

Each of the first ultrasonic transducer 1 and the second ultrasonic transducer 2 is connected to the matching section 5 by a switching section 12. Either of the first ultrasonic transducer 1 and the second ultrasonic transducer 2 is selectively connected to the matching section 5 by the selecting operation of the switching section 12. The matching section 5 is connected to the transmitting section 3 and adjusts the output impedance of the transmitting section 3 for impedance matching between the transmitting section 3 and the first ultrasonic transducer 1 or the second ultrasonic transducer 2.

The ultrasonic flowmeter 51 further has a directional coupler 15 provided between the transmitting section 3 and the matching section 5, and a reflected wave detection section 4 connected to the directional coupler 15. When the impedances of the transmitting section 3 and the first ultrasonic transducer 1 or the second ultrasonic transducer 2 are not matched to each other, the drive signal transmitted to the first ultrasonic transducer 1 or the second ultrasonic transducer 2 is reflected by the first ultrasonic transducer 1 or the second ultrasonic transducer 2 because of the impedance mismatch to return to the transmitting section 3.

The directional coupler 15 guides this reflected wave travel to the reflected wave detection section 4. The drive signal transmitted from the transmitting section 3 to the first ultrasonic transducer 1 or the second ultrasonic transducer 2 is not guided to the reflected wave detection section 4.

Each of the first ultrasonic transducer 1 and the second ultrasonic transducer 2 is connected to the receiving section 6 by a switching section 13. The ultrasonic wave reaching the first ultrasonic transducer 1 and the second ultrasonic transducer 2 is converted into an electric signal, and this received signal is amplified by the receiving section 6. Preferably, the input impedance of the receiving section 6 is 20Ω or lower and the input impedance on the receiving section side as seen from the first ultrasonic transducer 1 or the second ultrasonic transducer 2, including the resistance of the switching section 13, is 40Ω or lower. In this embodiment, the input impedance of the receiving section 6 is 2Ω. If the electric signal obtained from the ultrasonic wave reaching the first ultrasonic transducer 1 or the second ultrasonic transducer 2 is sufficiently large, amplification of the received signal by the receiving section 6 is not necessarily required.

Preferably, the switching section 12 and the switching section 13 operate in a linked relationship such that the receiving portion 6 is connected to the second ultrasonic transducer 2 when the first ultrasonic transducer 1 is connected to the matching section 5, and the receiving portion 6 is connected to the first ultrasonic transducer 1 when the second ultrasonic transducer 2 is connected to the matching section 5. Each of the switching sections 12 and the switching section 13 may be a mechanical component such as a toggle switch or may be constituted by an electronic component or the like.

The received signal amplified by the receiving section 6 is sent to a zero-cross detection section 7, which detects the zero-cross point immediately after a time at which a predetermined level is reached by the received signal, and thereby generates a zero-cross detection signal. A band pass filter for extracting only the resonance frequency components of the first ultrasonic transducer 1 and the second ultrasonic transducer 2 from the received signals may be provided between the receiving section 6 and the zero-cross detection section 7.

A repeating section 8 generates a trigger signal with a delay of a predetermined time period on the basis of the zero-cross detection signal, and outputs the trigger signal to the transmitting section 3. The transmitting section 3 drives the first ultrasonic transducer 1 or the second ultrasonic transducer 2 on the basis of the trigger signal.

A time measurement section 9 measures the time taken to repeat sing-around a predetermined number of times, and sends the result of measurement to a flow volume computation section 11. Each of the sections except the reflected wave detection section 4 and the matching section 5 is controlled by a computing unit such as a microcomputer.

Figure 5:
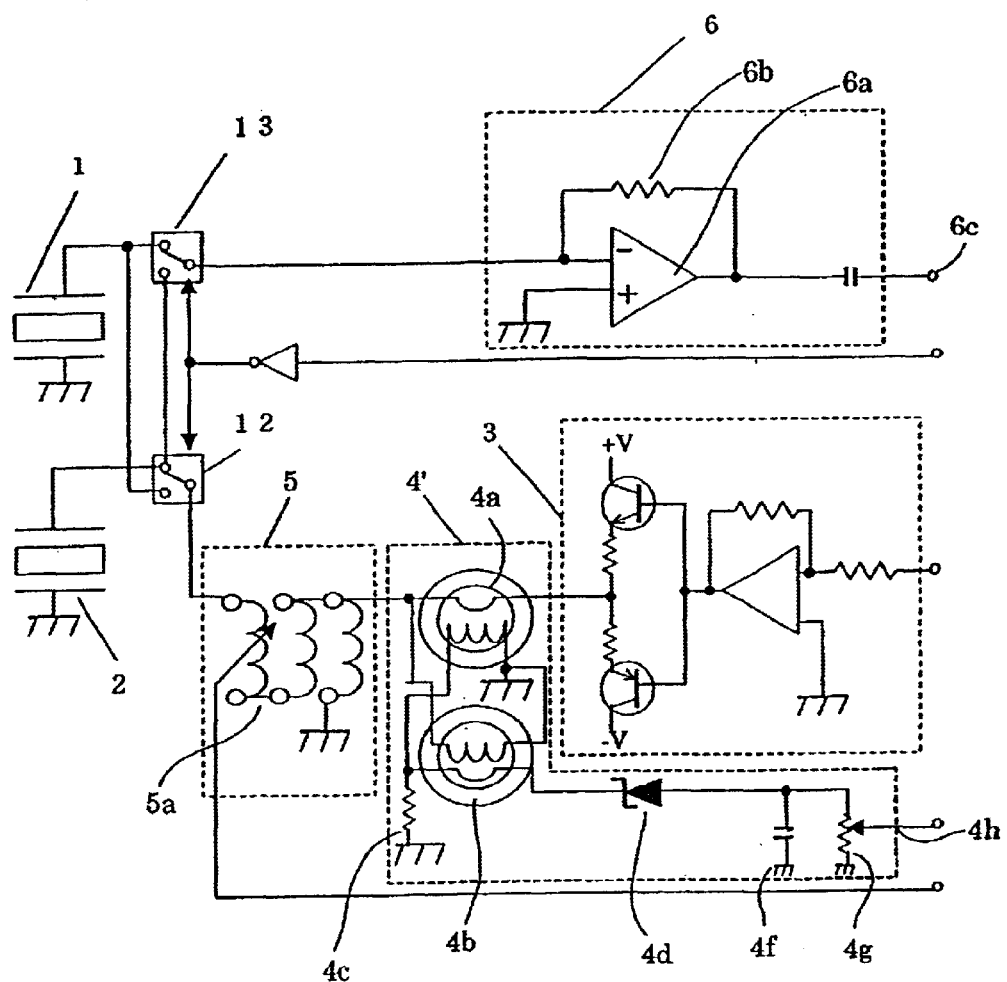
FIG. 5 is a circuit diagram showing a configuration of an essential portion of the ultrasonic flowmeter shown in FIG. 4.

FIG. 5 is a circuit diagram showing a concrete example of a configuration of the transmitting section 3, a reflected wave detection section 4' including a directional coupler, the matching section 5, and the receiving section 6 in the ultrasonic flowmeter 51. As shown in FIG. 5, the receiving section 6 includes an operational amplifier 6a, and part of an output from the operational amplifier 6a is fed back by using a resistor 6b. The inverting input terminal of the operational amplifier 6a is connected to the first ultrasonic transducer 1 or the second ultrasonic transducer 2 with no resistor interposed therebetween. By using this configuration, the input impedance of the receiving section 6 can be set to 2 Ω.

The reflected wave detection section 4' includes coils 4a and 4b and a directional coupler. A reflected wave returned from the first ultrasonic transducer 1 or the second ultrasonic transducer 2 via the matching section 5 is detected as a signal by the coils 4a and 4b and this signal is supplied to a detection output terminal 4h via a constant-voltage diode 4d to be output from this terminal. On the other hand, the drive signal sent from the transmitting section 3 to the first ultrasonic transducer 1 or the second ultrasonic transducer 2 is also detected by the coils 4a and 4b but this signal is grounded through a resistor 4c. Therefore the drive signal is not output through the detection output terminal 4h. Thus, the coils 4a and 4b for detecting a reflected wave are inserted with the directional coupler between the matching section 5 and the transmitting section 3.

The matching section 5 includes a variable inductor 5a. The inductance of the variable inductor 5a can be changed by rotating a trimmer or the like to change the output impedance of the transmitting section 3.

As the zero-cross-detection section 7, the repeating section 8, the time measurement section 9 and the flow volume computation section 11 not shown in FIG. 5, pieces of hardware or software of well-known configurations can be used.

A procedure for measuring the flow volume of a fluid using the ultrasonic flowmeter 51 will next be described. First, by using the switching sections 12 and 13, the matching section 5 is connected to the first ultrasonic transducer 1 and the receiving section 13 is connected to the second ultrasonic transducer 2, as shown in FIG. 4.

Before measurement of the flow volume, the output impedance of the transmitting section 3 is matched to the impedance of the first ultrasonic transducer 1 at the resonance frequency. For this matching, a drive signal is generated from the transmitting section 3 to generate an ultrasonic wave from the first ultrasonic transducer 1. At this time, if the impedances of the transmitting section 3 and the first ultrasonic transducer 1 are not matched, part of the drive signal is reflected by the first ultrasonic transducer 1 to be returned as a reflected wave to the matching section 5. The reflected wave is guided by the directional coupler 15 to the reflected wave detection section 4 and detected by the same. A power meter or the like is connected to the detection output terminal 4h of the reflected wave detection section 4 to measure the power value of the reflected wave, for example. If the impedance difference between the transmitting section 3 and the first ultrasonic transducer 1 is larger, the reflected wave is larger and the power value is higher. If the output impedance of the transmitting section 3 matches completely to the impedance of the first ultrasonic transducer 1 at the resonance frequency, the power value is zero. As information on the magnitude of the reflected wave, a standing wave ratio or return loss other than the power value may be detected in the reflected wave detection section 4.

On the basis of the power value obtained by measurement, the variable impedance 5a of the matching section 5 is changed so that the output impedance of the transmitting section 3 is closer to the impedance of the first ultrasonic transducer 1 at the resonance frequency. An ultrasonic wave is again generated from the first ultrasonic transducer 1, the power value of the reflected wave is measured, and the variable impedance 5a of the matching section is adjusted on the basis of the obtained power value. This procedure is repeated until the power value of the reflected wave becomes equal to a predetermined value or falls into a predetermined range.

As mentioned above, the output impedance of the transmitting section 3 is preferably lager than ½ of the impedance of the first ultrasonic transducer. 1 at the resonance frequency and, more preferably, ±20% of the impedance of the first ultrasonic transducer 1 at the resonance frequency. Therefore, the power value of the reflected wave when the output impedance of the transmitting section 3 is ½ of the impedance of the first ultrasonic transducer 1 at the resonance frequency or the range of the power value of the reflected wave when the output impedance of the transmitting section 3 is ±20% of the impedance of the first ultrasonic transducer 1 at the resonance frequency may be obtained in advance to be set as a target value to be reached by the above-described adjustment.

Figure 6:
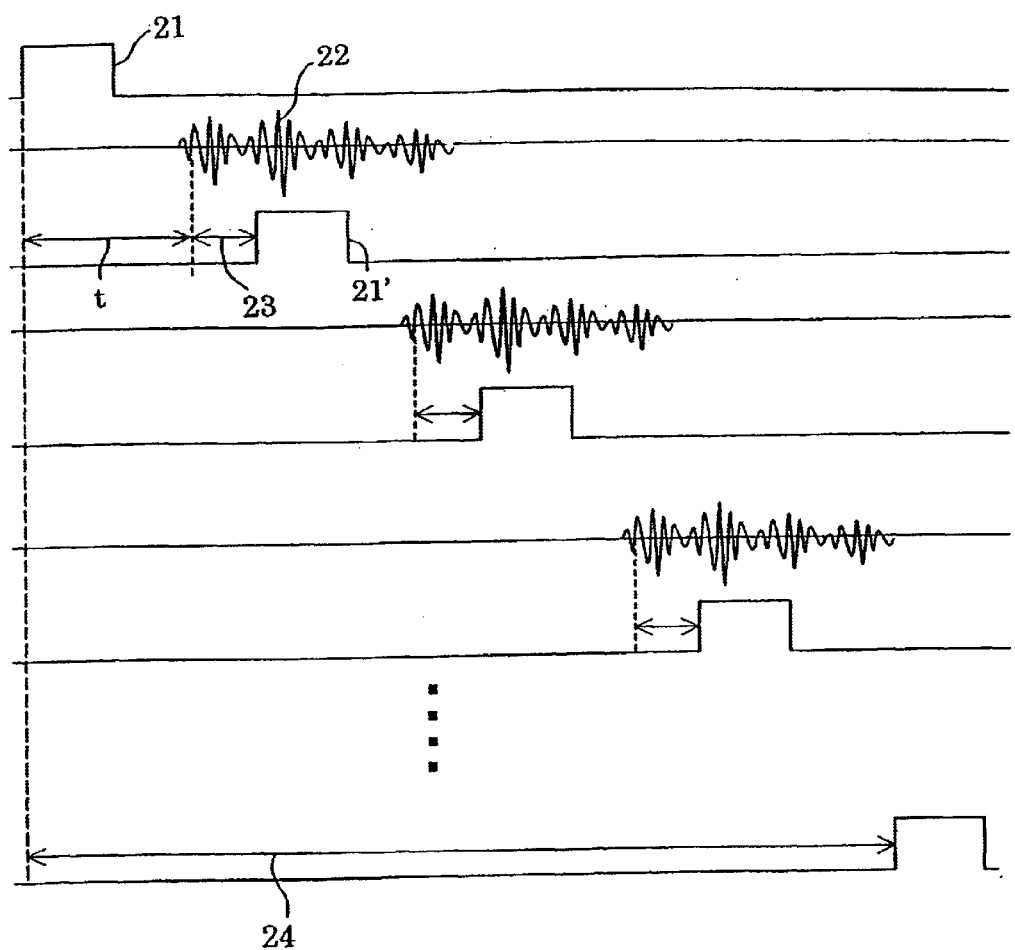
FIG. 6 is a diagram for explaining measurement by a sing-around method.

After the output impedance of the transmitting section 3 has been adjusted as described above, measurement of the flow volume is performed. As shown in FIGS. 4 and 6, a trigger signal 21 is input to the transmitting section 3 to generate a drive signal, by which an ultrasonic wave is generated from the first ultrasonic transducer 1. The ultrasonic wave propagates across the flow passage 14 and is received by the second ultrasonic transducer 2 to be detected as a received signal 22 by the receiving section 6. The zero-cross detection section 7 detects the zero-cross point immediately after the time at which the predetermined level is reached by the received signal 22, and generates a zero-cross detection signal. The repeating section 8 generates a trigger signal 21' after a lapse of a predetermined delay time 23 on the basis of the zero-cross detection signal, and outputs the trigger signal 21' to the transmitting section 3, thus forming one sing-around loop.

After sing-around has been repeated a predetermined number of times (e.g., 50 to 1000 times), the time measurement section 9 measures a total time 24 taken to repeat the loop, and sends the measurement result to the flow volume computation section 11. The total time 24 is divided by the number of times sing-around is repeated. The delay time 23 is subtracted from the value obtained by this division to obtain a value corresponding t1 shown in the equations (1).

Next, by using the switching sections 12 and 13, the matching section 5 is connected to the second ultrasonic transducer 2 and the receiving section 13 is connected to the first ultrasonic transducer 1. Thereafter, the output impedance of the transmitting section 3 is matched to the impedance of the second ultrasonic transducer 2 at the resonance frequency by using the matching section 5 in the same procedure as that described above.

After adjustment of the output impedance of the transmitting section 3, an ultrasonic wave is generated from the second ultrasonic transducer 2 and received by the first ultrasonic transducer 1 by the same procedure as that described above. After sing-around has been repeated the predetermined number of times, the time measurement section 9 measures the total time 24 taken to repeat the loop, and sends the measurement result to the flow volume computation section 11. The total time 24 is divided by the number of times sing-around is repeated. The delay time 23 is subtracted from the value obtained by this division to obtain a value corresponding t2 shown in the equations (1).

The values of t1 and t2 and the angle θ are substituted in the equation (2) to obtain the flow rate V of the fluid. If the sectional area of the flow passage 14 is S, the flow volume Q can be obtained by V×S. This flow volume Q is the amount of the fluid moving per unit time. The total amount of the fluid flowing in a certain length of time can be obtained by integration of the flow volume Q.

Figure 7:
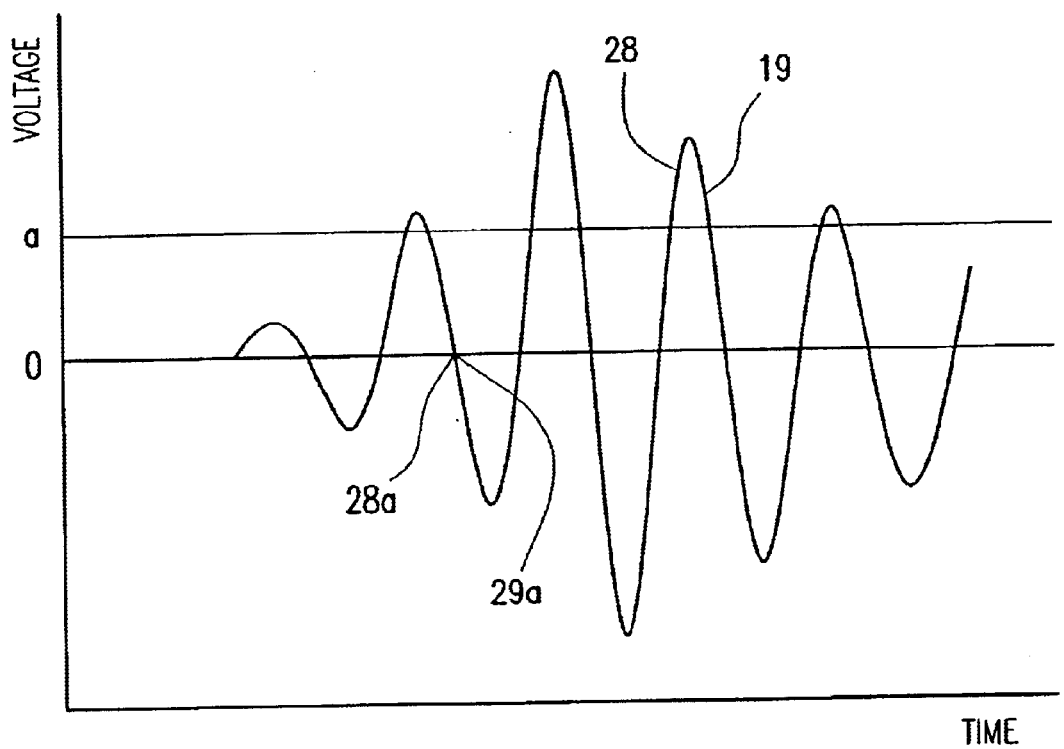
FIG. 7 is a diagram showing the waveform of signals received by the first and second ultrasonic transducers in a case where the fluid is in a stationary state in the ultrasonic flowmeter of the present invention.

FIG. 7 shows a waveform 28 obtained when an ultrasonic wave transmitted from the first ultrasonic transducer 1 is received by the second ultrasonic transducer 2 while the fluid is in a stationary state in the ultrasonic flowmeter 51, and a waveform 29 obtained when ultrasonic wave transmitted from the second ultrasonic transducer 2 is received by the first ultrasonic transducer 1. As described above, the output impedance of the transmitting section 3 is matched to the impedance of the first ultrasonic transducer 1 at the resonance frequency by using the matching section 5 when an ultrasonic wave is transmitted from the first ultrasonic transducer 1, and the output impedance of the transmitting section 3 is matched to the impedance of the second ultrasonic transducer 2 at the resonance frequency by using the matching section 5 when an ultrasonic wave is transmitted from the second ultrasonic transducer 2. The waveform 28 and the waveform 29 coincide completely with each other, as shown in FIG. 7. Accordingly, a zero-cross point 28a of the waveform 28 and a zero-cross point 29a of the waveform 29 coincide with each other.

In this embodiment, as described above, the output impedance of the transmitting section 3 is matched to each of the impedances of the first ultrasonic transducer 1 and the second ultrasonic transducer 2 at the resonance frequency and the input impedance of the receiving section 6 is lowered, thereby reducing the difference between received waves due to a characteristic difference between the first ultrasonic transducer 1 and the second ultrasonic transducer 2 to reduce the measurement error resulting from the characteristic difference.

Also, the output impedance of the transmitting section 3 is matched to each of the impedances of the first ultrasonic transducer 1 and the second ultrasonic transducer 2 at the resonance frequency to enable the drive signal to propagate to the ultrasonic transducer with improved efficiency. It is also possible to present an undesirable phenomenon in which a reflected wave leaks from each of the switching sections 12 and 13 to the receiving side to affect the received signal to be detected to such an extent that a detection error occurs.

In the above-described embodiment, the operation for impedance matching between the transmitting section 3 and the second ultrasonic transducer 2 is also performed when the second ultrasonic transducer 2 is used as a transmitter. However, this operation may be omitted and the output impedance of the transmitting section 3 matching to the impedance of the first ultrasonic transducer 1 may be kept. This is because, by reducing the input impedance of the receiving section 6 and by setting the output impedance of the transmitting section 3 close to the impedance of the first ultrasonic transducer 1 at the resonance frequency, the entire portion including the first ultrasonic transducer 1, the second ultrasonic transducer 2, the transmitting section 3 and the receiving section 6 is adjusted so as to be unsusceptible to the influence of a characteristic difference between the first ultrasonic transducer 1 and the second ultrasonic transducer 2. In particular, in a case where a pair of ultrasonic transducers having characteristics well matched to each other are selected from a plurality of ultrasonic transducers as the first ultrasonic transducer 1 and the second ultrasonic transducer 2, the second impedance matching operation may be omitted.

Figure 8A:
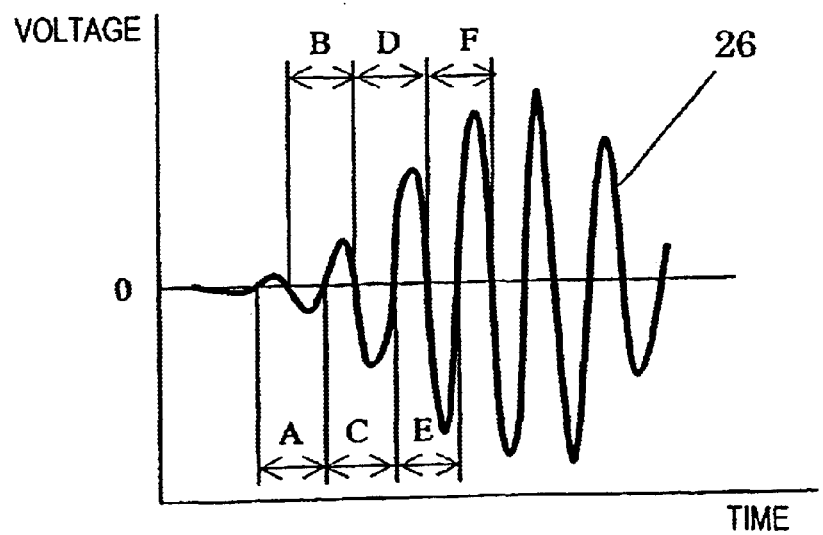
FIGS. 8A and 8B are diagrams showing received waveforms when the flow volume is high.
Figure 8B:
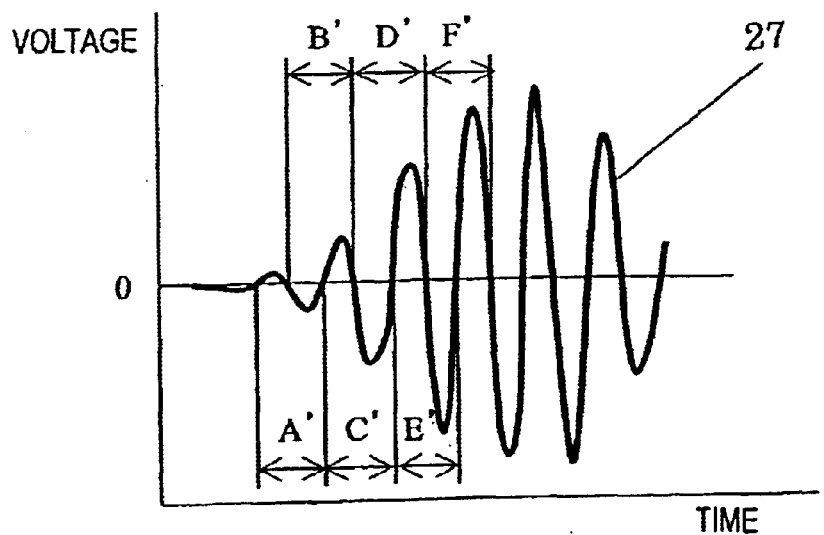

The ultrasonic flowmeter of this embodiment is capable of measuring the flow volume of a fluid with high accuracy through a wide flow volume range even if the ultrasonic transducers have variation in characteristics. However, when the flow velocity of the fluid is excessively high with respect to the ultrasonic wave frequency, there is a possibility of an error in measurement resulting from the difference between the frequency of the ultrasonic wave propagating from the first ultrasonic transducer 1 to the second ultrasonic transducer 2 and the frequency of the ultrasonic wave propagating from the second ultrasonic transducer 2 to the first ultrasonic transducer 1 due to unbalance of the acoustic impedance of the medium. That is, as shown in FIGS. 8A and 8B, intervals A, B, C, and D between pints at which zero-crossing of the amplitude of an ultrasonic wave 26 propagating from the first ultrasonic transducer 1 to the second ultrasonic transducer 2 occur and intervals A', B', C', and D' between pints at which zero-crossing of the amplitude of an ultrasonic wave 27 propagating from the second ultrasonic transducer 2 to the first ultrasonic transducer 1 occur do no coincide with each other.

In such a case, a plurality of zero-cross points are set and t1 and t2 at each zero-cross point are obtained. The difference between the propagation times obtained by using each zero-cross point is multiplied by a flow volume coefficient stored in advance to obtain a corrected flow velocity V'. This flow velocity is multiplied by the sectional area S of the flow passage to obtain the flow volume. If flow volume correction is made in this manner, the flow volume can be obtained with accuracy even when the flow velocity is high.

In the above-described embodiment, the output impedance of the transmitting section 3 is adjusted by using the reflected wave detection section 4. However, the arrangement may alternatively be such that the impedances of the first ultrasonic transducer 1 and the second ultrasonic transducer 2 at thickness vibration resonance frequencies are obtained in advance and the matching section 5 is adjusted so as to match to each of these impedances.

(Second Embodiment)

Figure 9:
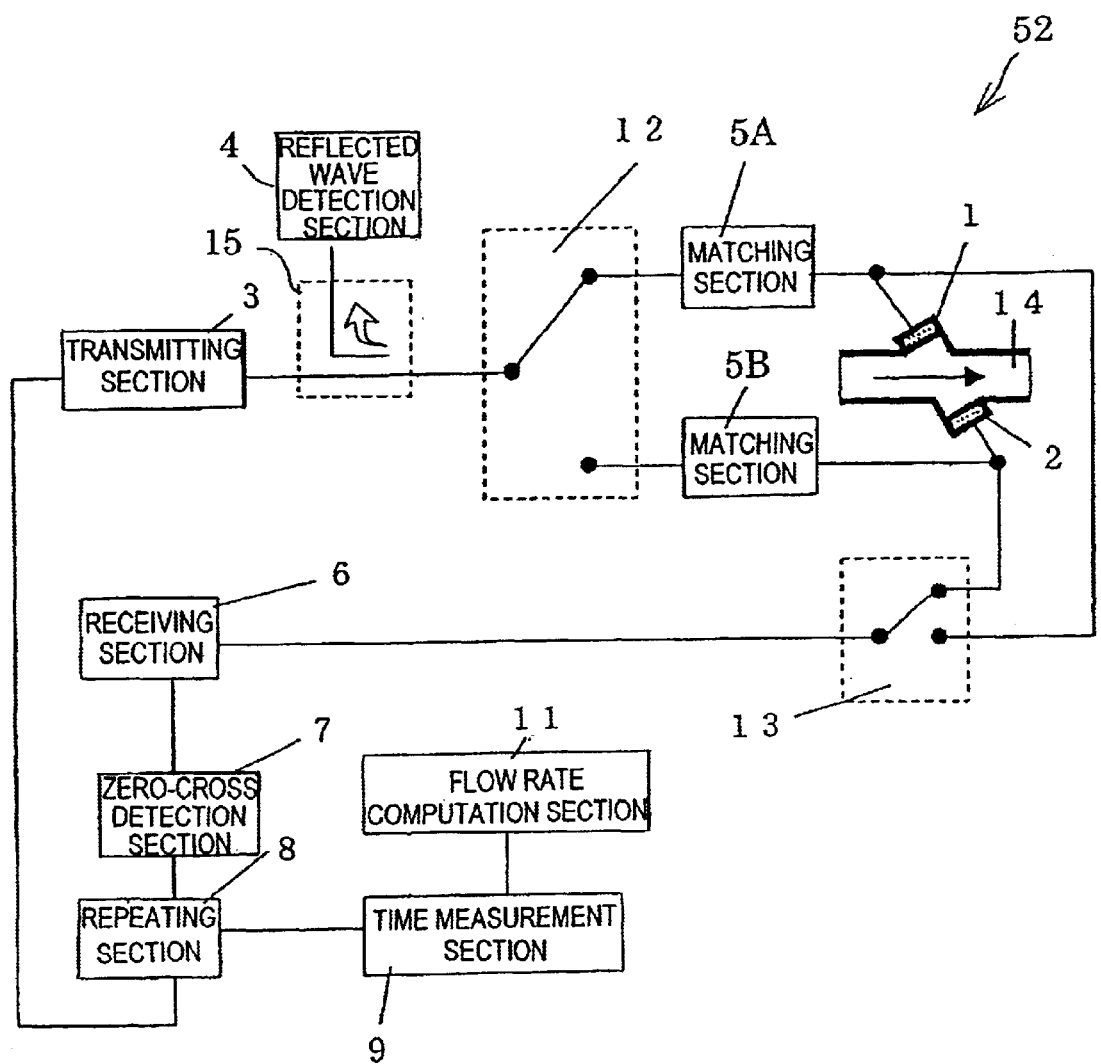
FIG. 9 is a block diagram showing an ultrasonic flowmeter which represents a second embodiment of the present invention.

FIG. 9 is a block diagram showing an ultrasonic flowmeter which represents a second embodiment of the present invention. An ultrasonic flowmeter 52 of this embodiment differs from the ultrasonic flowmeter 51 of the first embodiment in that it has two matching sections for adjusting the output impedance of the transmitting section 3.

More specifically, the ultrasonic flowmeter 52 has a first matching section 5A and a second matching section 5B. The first matching section 5A and the second matching section 5B are inserted between the switching section 12 and the first ultrasonic transducer 1 and between the switching section 12 and the second ultrasonic transducer 2, respectively.

In the ultrasonic flowmeter 52 of this embodiment, the first matching section 5A is used for impedance matching between the transmitting section 3 and the first ultrasonic transducer 1, and the second matching section 5B is used for impedance matching between the transmitting section 3 and the second ultrasonic transducer 2. Therefore there is no need to adjust the output impedance of the transmitting section 3 each time the first ultrasonic transducer 1 or the second ultrasonic transducer 2 is selected by the switching section 12. For example, if no change occurs with time in the impedance of each of the first ultrasonic transducer 1 and the second ultrasonic transducer 2 at the resonance frequency, adjustment of the first matching section 5A for impedance matching between the transmitting section 3 and the first ultrasonic transducer 1 and adjustment of the second matching section 5B for impedance matching between the transmitting section 3 and the second ultrasonic transducer 2 may be performed only one time to enable measurement of the flow volume with high accuracy.

(Third Embodiment)

Figure 10:
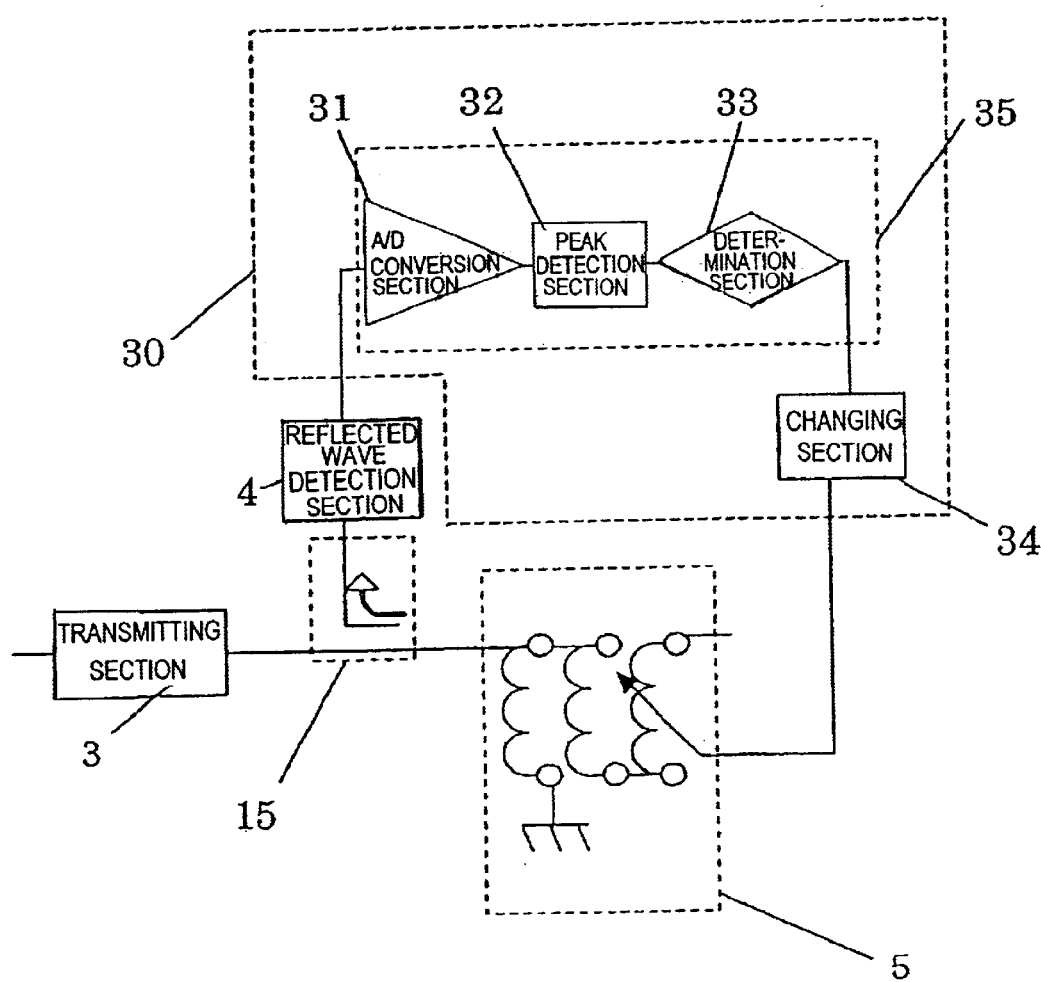
FIG. 10 is a block diagram showing an essential portion of an ultrasonic flowmeter which represents a third embodiment of the present invention.

FIG. 10 is a block diagram showing an essential portion of an ultrasonic flowmeter which represents a third embodiment the present invention. The ultrasonic flowmeter of this embodiment differs from the ultrasonic flowmeter of the first embodiment in that it has a control section 30 for automatically controlling the matching section 5 on the basis of information about reflected waves detected by the reflected wave detection section 4.

The control section 30 includes an A/D conversion section 31, a peak detection section 32, a determination section 33, and a changing section 34. The A/D conversion section 31 converts into a digital signal a signal relating to a reflected wave detected by the reflected wave detection section 4. A peak value of the converted digital signal is detected by the peak detection section 31. The determination section 33 compares the latest peak value and the stored immediately preceding peak value to obtain a comparison value, determines on the basis of the comparison value such a control signal that the reflected wave becomes smaller, and outputs the control signal to the changing section 34. The changing section 34 changes the impedance of the matching section 5 on the basis of the control signal. The A/D conversion section 31, the peak detection section 32 and the determination section 33 can be formed by a control unit 35 such as a microcomputer which performs overall control on the other sections of the ultrasonic flowmeter.

Timing of adjustment of the matching section 5 by the control section 30 can be determined as desired according to use of the ultrasonic flowmeter and required measurement accuracy. If high measurement accuracy is required, the ultrasonic flowmeter may be arranged so that the matching section 5 is adjusted at all times by the control section 30. Also, the matching section 5 may be adjusted by the control section 30 according to intervals at which certain changes are probable to occur in characteristics of the first ultrasonic transducer 1 and the second ultrasonic transducer 2.

In this embodiment, impedance matching between the transmitting section 3 and each of the first ultrasonic transducer 1 and the second ultrasonic transducer 2 can be automatically effected and, therefore, an ultrasonic flowmeter having high measurement accuracy as well as improved reliability can be realized. In particular, an ultrasonic flowmeter can be realized which has high accuracy and reliability even in a case where the temperature of an environment in which flow volume is measured changes largely, or a case where the flow volume is measured by installing the ultrasonic flowmeter for a long period of time.

While this embodiment has been described with respect to an example of an arrangement in which the control section 30 is provided in the ultrasonic flowmeter 51 of the first embodiment, the control section 30 may alternatively be provided in the ultrasonic flowmeter 52 of the second embodiment.

(Fourth Embodiment)

A gas meter having the ultrasonic flowmeter of the present invention will be described.

Figure 11:
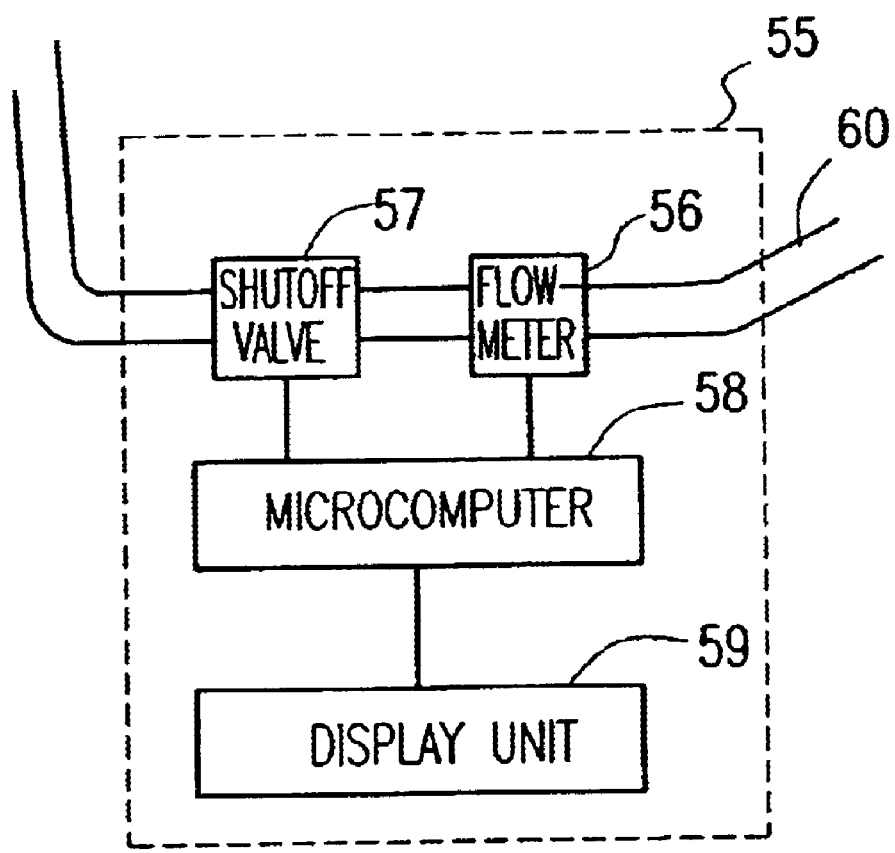
FIG. 11 is a block diagram showing a gas meter which represents a fourth embodiment of the present invention.
Figure 12:
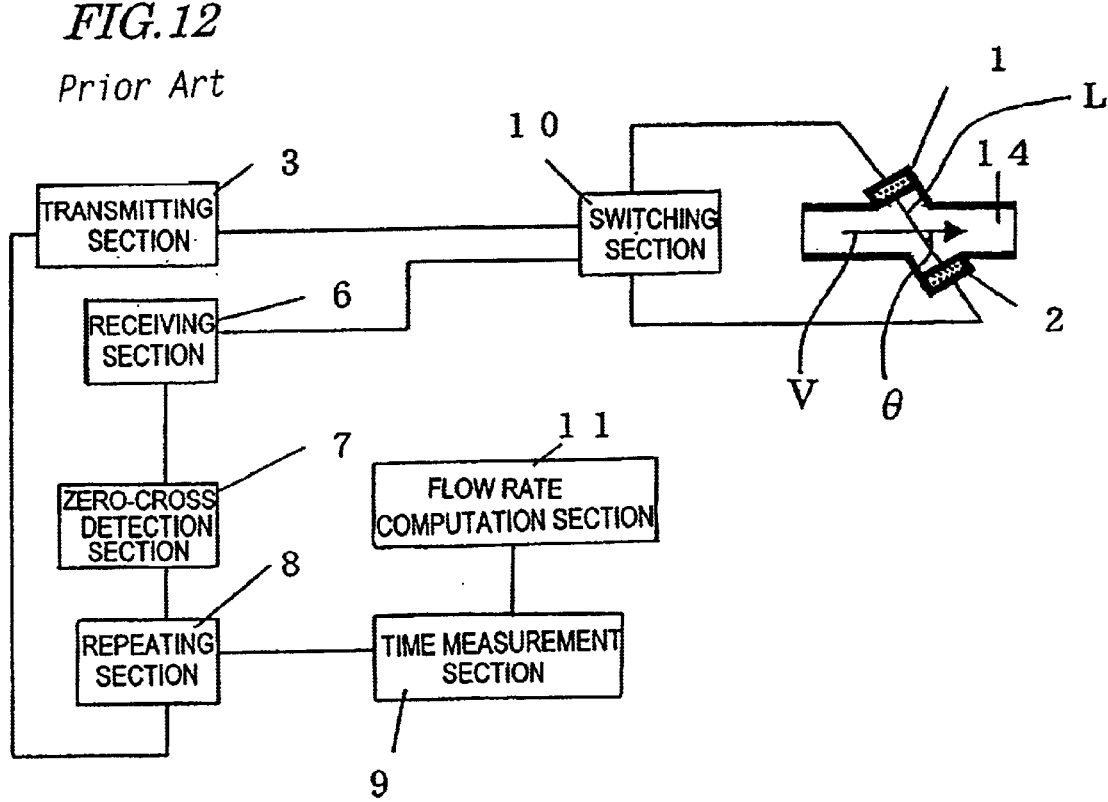
FIG. 12 is a block diagram showing a conventional ultrasonic flowmeter.
Figure 13:
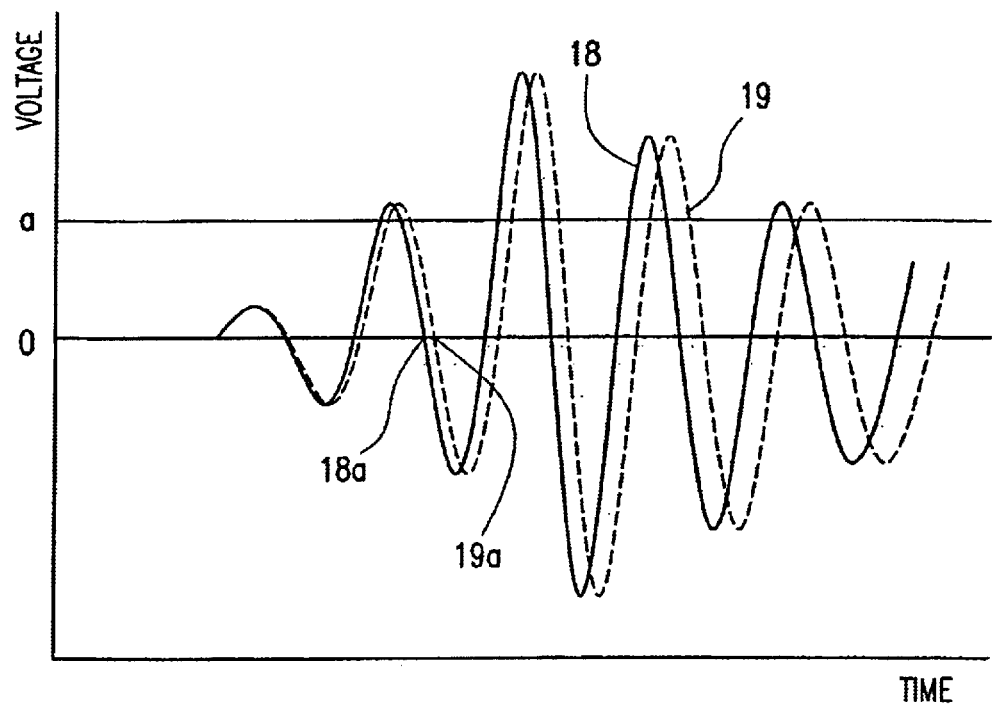
FIG. 13 is a diagram showing a difference between received waveforms produced in the conventional ultrasonic flowmeter.
Figure 14:
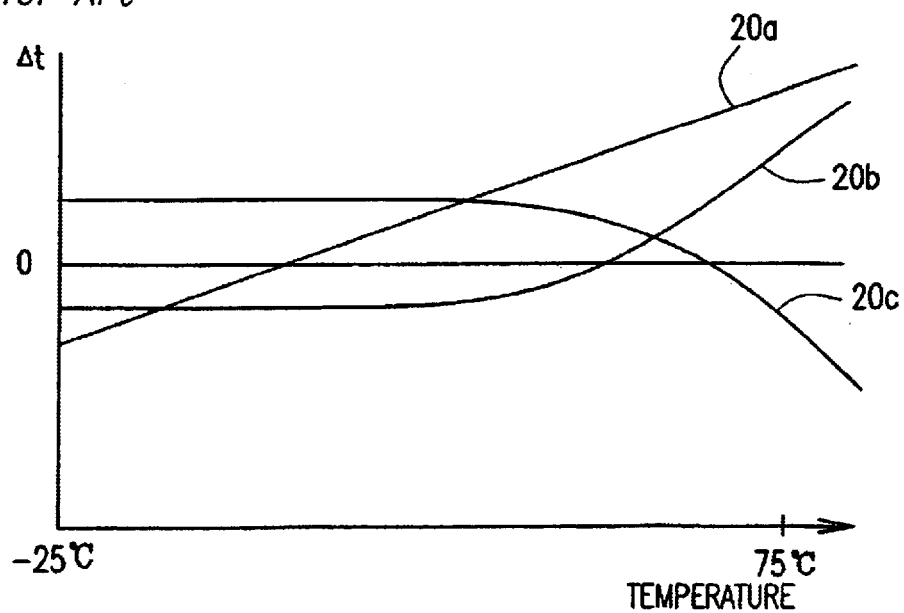
FIG. 14 is a graph showing a temperature dependence of variation in characteristics of the conventional ultrasonic flowmeter.

FIG. 11 is a block diagram of a gas meter 55 for measuring the flow volume of a gas flowing in a pipe 60 in gas piping. The gas flowing in the pipe 60 may be an ordinary gas for home use, e.g., a natural gas or propane gas, or any other gas such as hydrogen or oxygen.

The gas meter 55 has an ultrasonic flowmeter 56 for measuring the rate at which the gas flows in the pipe 60, a shutoff valve 57 for shutting off the gas flowing in the pipe 60 in the event of an emergency, a control unit 58 such as a microcomputer for controlling the ultrasonic flowmeter 56 and the shutoff valve 57, and a display unit 59 for displaying the flow volume measured by using the ultrasonic flowmeter 56, the integral of the flow volume, and other sorts of information.

As the ultrasonic flowmeter 56 in this embodiment, the ultrasonic flowmeter of the third embodiment is used. The ultrasonic flowmeter 56 has a control section for automatically controlling the matching section, as does the ultrasonic flowmeter described as the third embodiment. This control section is formed by using functions of the microcomputer 58. Timing of adjustment of the matching section by the control section may be determined as desired according to use. If high measurement accuracy is required, the ultrasonic flowmeter may be arranged so that the matching section is adjusted at all times by the control section. If the measurement accuracy is affected by changes in temperature in a day, the matching section may be adjusted every hour or at intervals of several hours.

Data on the flow volume measured by the ultrasonic flowmeter 56 is processed by the microcomputer 58 and displayed on the display unit 59. The microcomputer 58 also monitors whether any abnormality of the measured flow volume exists. For example, in a case where the gas abruptly starts flowing at a high rate, the microcomputer 58 determines that a leak of the gas has occurred and operates the shutoff valve 57 to stop supply of the gas.

According to this embodiment, a gas meter having high measurement accuracy and reliability can be realized. Gas meters are ordinarily installed outdoors and are therefore liable to be influenced by variation in temperature in a day or variation in one-day average temperature due to seasonal changes. In particular, the gas meter of the present invention is capable of measurement with high accuracy without being influenced by such variation in temperature.

In the ultrasonic flowmeter of the present invention, the difference between received waves due to a characteristic difference between two ultrasonic transducers can be reduced to reduce the measurement error resulting from the characteristic difference. Consequently, the present invention enables measurement of the flow volume with high accuracy.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. An ultrasonic flowmeter comprising:

first and second ultrasonic transducers which transmit and receive ultrasonic waves, and which are placed so as to form a path for propagation of the ultrasonic waves in a flow passage for a fluid;

a transmitting section which drives one of said first and second ultrasonic transducers at a resonance frequency;

a first matching section which is connected to said transmitting section, and which adjusts the output impedance of said transmitting section;

a receiving section which has an input impedance lower than the adjusted output impedance, and which receives the ultrasonic wave reaching the other of said first and second ultrasonic transducers;

a first switching section for selectively connecting said first matching section and one of said first and second ultrasonic transducers; and a second switching section for selectively connecting said receiving section and one of said first and second ultrasonic transducers, wherein the flow volume of the fluid is measured by detecting a bidirectional-propagation time difference between the ultrasonic waves propagating in said propagation path.

2. The ultrasonic flowmeter according to claim 1, wherein the adjusted output impedance is larger than ½ of the impedance value that one of said first and second ultrasonic transducers has at its resonance frequency.

3. The ultrasonic flowmeter according to claim 2, wherein the adjusted output impedance is substantially equal to the impedance value of one of said first and second ultrasonic transducers.

4. The ultrasonic flowmeter according to claim 1, wherein the input impedance is 40Ω or lower.

5. The ultrasonic flowmeter according to claim 1, wherein the input impedance is 20Ω or lower.

6. The ultrasonic flowmeter according to claim 1, wherein said first matching section is adjusted so that the output impedance is substantially matched to the impedance at the resonance frequency of the ultrasonic transducer selected by said switching section.

7. The ultrasonic flowmeter according to claim 6, wherein each of said first and second ultrasonic transducers vibrates in a thickness vibration mode.

8. The ultrasonic flowmeter according to claim 1, further comprising a detection section for detecting a received signal amplified by said receiving section, wherein the time of arrival of the received signal is determined according to a zero-cross point in said detection section.

9. The ultrasonic flowmeter according to claim 8, further comprising a detection section for detecting a received signal amplified by said receiving section, wherein a plurality of zero-cross points are set with respect to the received signal in said detection section, and correction of the flow volume is made by using the plurality of zero-cross points.

10. The ultrasonic flowmeter according to claim 1, wherein an impedance of said first and second ultrasonic is minimized at the resonance frequency.

11. An ultrasonic flowmeter comprising:

first and second ultrasonic transducers which transmit and receive ultrasonic waves, and which are placed so as to form a path for propagation of the ultrasonic waves in a flow passage for a fluid;

a transmitting section which drives one of said first and second ultrasonic transducers;

a first matching section which is connected to said transmitting section, and which adjusts the output impedance of said transmitting section;

a receiving section which has an input impedance approximately equal to or lower than the adjusted output impedance, and which receives the ultrasonic wave reaching the other of said first and second ultrasonic transducers; and a reflected wave detection section for detecting a reflected wave caused by an impedance mismatch between said first or second ultrasonic transducer and said transmitting section, wherein the flow volume of the fluid is measured by detecting a bidirectional-propagation time difference between the ultrasonic waves propagating in said propagation path.

12. The ultrasonic flowmeter according to claim 11, further comprising a directional coupler for selectively guiding the reflected wave to said reflected wave detection section.

13. The ultrasonic flowmeter according to claim 6, further comprising a control section for controlling said first matching section on the basis of the reflected wave detected by said reflected wave detection section.

14. An ultrasonic flowmeter comprising:

first and second ultrasonic transducers which transmit and receive ultrasonic waves, and which are placed so as to form a path for propagation of the ultrasonic waves in a flow passage for a fluid;

a transmitting section which drives one of said first and second ultrasonic transducers;

a first matching section which is connected to said first ultrasonic transducer, and which adjusts the output impedance of said transmitting section;

a receiving section which has an input impedance approximately equal to or lower than the adjusted output impedance, and which receives the ultrasonic wave reaching the other of said first and second ultrasonic transducers; and a second matching section connected to said second ultrasonic transducer for adjusting the output impedance of said transmitting section;

a first switching section for selectively connecting said transmitting section and one of said first matching section and said second matching section; and a second switching section for selectively connecting said receiving section and one of said first and second ultrasonic transducers, wherein said first and second matching sections are respectively connected to said first and second ultrasonic transducers, and wherein the flow volume of the fluid is measured by detecting a bidirectional-propagation time difference between the ultrasonic waves propagating in said propagation path.

15. The ultrasonic flowmeter according to claim 11, wherein each of said first and second matching sections is adjusted so that the output impedance is substantially matched to the impedance of the corresponding one of said first and second ultrasonic transducers at the resonance frequency.

16. A gas meter comprising:

(a) an ultrasonic flowmeter, the ultrasonic flowmeter including:

first and second ultrasonic transducers which transmit and receive ultrasonic waves, and which are placed so as to form a path for propagation of the ultrasonic waves in a flow passage for a fluid;

a transmitting section which drives one of said first and second ultrasonic transducers at a resonance frequency;

a first matching section which is connected to said transmitting section, and which adjusts the output impedance of said transmitting section;

a receiving section which has an input impedance lower than the adjusted output impedance, and which receives the ultrasonic wave reaching the other of said first and second ultrasonic transducers;

a first switching section for selectively connecting said first matching section and one of said first and second ultrasonic transducers; and a second switching section for selectively connecting said receiving section and one of said first and second ultrasonic transducers, wherein the flow volume of the fluid is measured by detecting a bidirectional-propagation time difference between the ultrasonic waves propagating in said propagation path, said ultrasonic flowmeter being provided on a flow passage in which a gas flows;

(b) a shutoff valve which shuts off the gas flowing in the flow passage; and (c) a control unit which controls said ultrasonic flowmeter and said shutoff valve.

17. A method of measuring the flow volume of a fluid, said method comprising the steps of:

providing a pair of ultrasonic transducers as a transmitter and a receiver, so as to form a path for propagation of ultrasonic waves in a flow passage for a fluid;

propagating ultrasonic waves in two directions along the propagation path by using a transmitting section for driving at a resonance frequency one of the pair of ultrasonic transducers and a receiving section which has an input impedance lower than the output impedance of the transmitting section, and which receives the ultrasonic wave reaching the other of the pair of ultrasonic transducers, and by switching a connection between the pair of ultrasonic transducers and the transmitting and receiving sections; and measuring the flow volume of the fluid by detecting a bidirectional-propagation time difference between the ultrasonic waves propagating along the propagation path.

18. The method according to claim 17, wherein the output impedance of said transmitting section is adjusted to a value at least lager than ½ of the impedance at a resonance frequency of the ultrasonic transducer used as a transmitter, and the input impedance of the receiving section for receiving the ultrasonic wave is set to a value equal to or smaller than the output impedance of the transmitting section.

19. The method according to claim 18, wherein the output impedance of the transmitting section is adjusted to a value substantially equal to the impedance at a resonance frequency of the ultrasonic transducer used as a transmitter.

20. The method according to claim 18, wherein the input impedance of the receiving section is set to 40Ω or lower.

21. The method according to claim 18, wherein the input impedance of the receiving section is set to 20Ω or lower.

22. The method according to claim 18, wherein a reflected wave caused by an impedance mismatch between the pair of ultrasonic transducers and the transmitting section is detected and the output impedance of the transmitting section is adjusted so that the reflected wave becomes smaller.

* * * * *

UNITED STATES PATENT AND TRADEMARK OFFICE
CERTIFICATE OF CORRECTION

PATENT NO. : 6,925,891 B2
DATED : August 9, 2005
INVENTOR(S) : Takehiko Suginouchi et al.

It is certified that error appears in the above-identified patent and that said Letters Patent is hereby corrected as shown below:

<u>Title page,</u>
Item [75], Inventors, the first inventor's address should read -- Nara-shi (JP) --; and the second inventor's address should read -- Shijonawate-shi (JP) --;

<u>Column 18,</u>
Line 44, "according to claim 6" should read -- according to claim 1 --;

<u>Column 19,</u>
Line 21, "according to claim 6" should read -- according to claim 11 --;
Line 57, "according to claim 11" should read -- according to claim 14 --;

<u>Column 20,</u>
Line 48, "lager" should read -- larger --.

Signed and Sealed this

Fourth Day of April, 2006

JON W. DUDAS
*Director of the United States Patent and Trademark Office*